United States Patent [19]

Kuramoto et al.

[11] 4,231,341
[45] Nov. 4, 1980

[54] EXHAUST GAS FLOW CONTROL VALVE APPARATUS FOR USE IN AN INTERNAL COMBUSTION ENGINE

[75] Inventors: Akio Kuramoto, Okazaki; Toshinari Onishi, Toyota, both of Japan

[73] Assignee: Toyota Jidosha Kogyo Kabushiki Kaisha, Toyota, Japan

[21] Appl. No.: 917,654

[22] Filed: Jun. 21, 1978

[30] Foreign Application Priority Data

May 12, 1978 [JP] Japan ................... 53/55684

[51] Int. Cl.³ .................. F02M 31/00; F16K 5/00
[52] U.S. Cl. .................... 123/552; 251/214; 251/306; 123/548; 123/547; 123/543
[58] Field of Search ............. 251/303, 214, 306; 123/122 H, 122 R, 122 AC, 122 AB

[56] References Cited

U.S. PATENT DOCUMENTS

| | | | |
|---|---|---|---|
| 2,226,011 | 12/1940 | Murphy | 123/122 H |
| 2,819,025 | 1/1958 | Else et al. | 123/122 H |
| 2,857,926 | 10/1958 | Rundquist | 123/122 H |
| 2,859,772 | 11/1958 | Weiss | 123/122 H |
| 2,981,480 | 4/1961 | Else | 123/122 H |
| 3,011,488 | 12/1961 | Ioepel | 123/122 H |
| 3,603,341 | 9/1971 | Scarmucci | 251/306 |
| 3,774,879 | 11/1978 | Zink | 123/122 H |
| 3,916,943 | 11/1975 | Hester | 251/214 |
| 3,954,251 | 5/1976 | Callahan | 251/214 |
| 4,176,823 | 12/1979 | Gliatas | 251/214 |

*Primary Examiner*—Ronald H. Lazarus
*Attorney, Agent, or Firm*—Kenyon & Kenyon

[57] ABSTRACT

An exhaust gas flow control valve apparatus comprising a rotary valve shaft extending across the exhaust passage in the exhaust housing. The shaft has an end portion projecting from the exhaust housing. A bimetallic element is mounted on the end portion of the shaft. A hollow collar is sealingly fitted onto the end portion of the shaft. A compression spring is arranged at one end of the shaft, so as to urge the hollow collar against the wall of the exhaust housing, for preventing leakage of the exhaust gas.

13 Claims, 4 Drawing Figures

EXHAUST GAS FLOW CONTROL VALVE APPARATUS FOR USE IN AN INTERNAL COMBUSTION ENGINE

DESCRIPTION OF THE INVENTION

The present invention relates to an exhaust gas flow control valve apparatus of an internal combustion engine.

In a conventional engine, exhaust gas flow control valve apparatuses of various types have been adopted for controlling the flow of the exhaust gas. In such an exhaust gas flow control valve apparatus, the shaft of an exhaust gas flow control valve is normally inserted rotatably into bushes which are fixed into a housing defining the exhaust passage so that the exhaust gas flow control valve rotates in accordance with changes in the temperature of an engine, or in the operating condition of an engine, for controlling the fow of the exhaust gas in the exhaust passage of an engine. However, since such an exhaust gas flow control valve is always exposed to exhaust gas having a high temperature, thermal expansion of the exhaust gas flow control valve is caused. In addition, fine particles floating in the exhaust gas enter into the space between the bush and the shaft of the exhaust gas flow control valve and are deposited in said space. This results in a danger that the shaft of the exhaust gas flow control valve cannot rotate. In order to avoid this danger, it is necessary to form a clearance having a relatively large size between the bush and the shaft of the exhaust gas flow control valve, and it has been proven that, in order to always obtain smooth rotation of the valve shaft, it is necessary to form a clearance of at least 0.15 through 0.3 mm between the bush and the valve shaft. However, by forming such a clearance, there occurs a problem in that the exhaust gas and the exhaust noise leak outside of the exhaust housing via the clearance formed between the bush and the valve shaft. In addition, air enters into the exhaust gas via the clearance between the bush and the valve shaft due to the production of a vacuum, which is caused by the pulsating exhaust gas, thus resulting in a problem in that after-burn is caused.

An object of the present invention is to provide an exhaust gas flow control valve apparatus capable of completely preventing the leakage of exhaust gas and exhaust noise and preventing the inflow of air into the exhaust gas.

According to the present invention, there is provided an exhaust gas flow control valve device of an internal combustion engine having an exhaust housing defining an exhaust passage therein, said device comprising: a rotary shaft extending across the exhaust passage and rotatably inserted into holes formed in opposing walls of the exhaust housing, said rotary shaft having an end portion projecting from the housing; a valve mounted on said shaft in the exhaust passage for controlling the flow of exhaust gas; means for rotating said shaft in accordance with change in operating condition of the engine; sealing means sealingly mounted on said shaft at a position near the projecting end portion of said shaft, and; resilient means for urging said sealing means against the wall of the exhaust housing for establishing sealing contact between said sealing means and the wall of the housing.

The present invention may be more fully understood from the description of preferred embodiments of the invention set forth below, together with the accompanying drawings.

DESCRIPTION OF PREFERRED EMBODIMENTS

Figure 1:
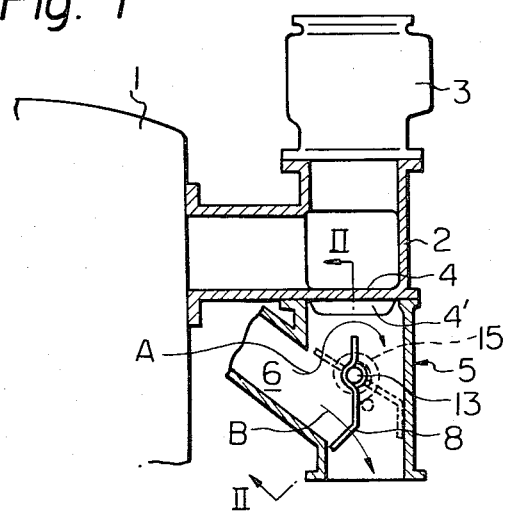
FIG. 1 is a cross-sectional side view of an engine equipped with an exhaust gas flow control value apparatus according to the present invention.
Figure 2:
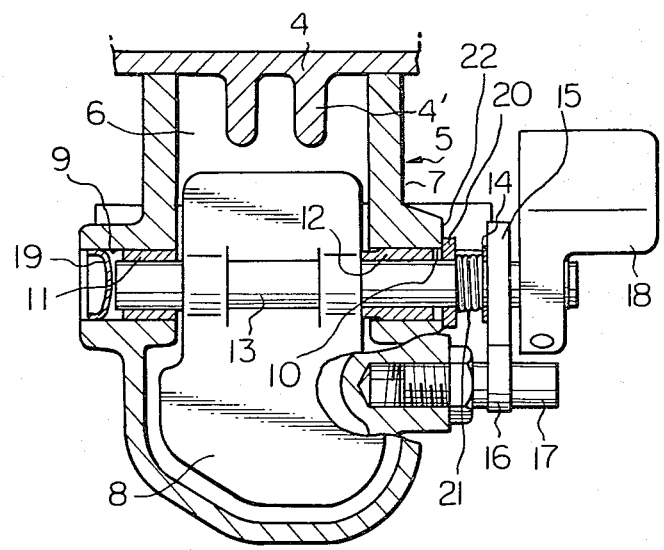
FIG. 2 is a cross-sectional view of an embodiment of an exhaust gas flow-control valve apparatus taken along the line II—II in FIG. 1.

Referring to FIGS. 1 and 2, 1 designates an engine body, 2 an intake manifold, 3 a carburetor and 4 a riser portion of the intake manifold 2; 4' designates a fin, 5 an exhaust manifold, and 6 an exhaust passage. An exhaust gas flow control valve 8 having the shape of butterfly valve is arranged in the exhaust passage 6. A pair of holes 9 and 10, which are aligned with each other, are formed on opposing walls of the housing 7 of the exhaust manifold 5, and bushes 11 and 12 are press-fitted into the holes 9 and 10, respectively. A valve shaft 13 is inserted into the bushes 11 and 12 with a cleareance of 0.15 through 0.3 mm therebetween, and the exhaust gas flow control valve 8 is fixed onto the valve shaft 13. A compression spring retainer 14 is fixed onto the projecting end of the valve shaft 13. The inner end of a helix shape bimetallic element 15 is fixed onto the valve shaft 13, and the outer end 16 of the bimetallic element 15 is arranged so as to abut against a stop bolt 17 screwed into the housing 7. A balance weight 18 is fixed onto the projecting tip of the valve shaft and the end face of the valve shaft 13, which is located at a position opposite to the balance weight 18 is isolated from the atmosphere by means of a blind cap 19, which is fitted into the hole 9. A hollow collar 20 made of stainless is sealingly fitted onto the projecting end of the valve shaft 13 with a clearance of less than 0.03 mm therebetween. A compression spring 21 is interposed between the retainer 14 and the hollow collar 20 so that the collar 20 is urged onto a flat outer face 22 of the housing 7 by the spring force of the compression spring 21.

In FIG. 1, when the temperature of the exhaust gas is low, the exhaust gas flow control valve 8 is positioned at a position shown by the solid line in FIG. 1. At this time, the exhaust gas flows in the exhaust passage 6 as shown by the arrow A. As a result of this, the riser portion 4 is heated by the exhaust gas and, thus, the vaporization of the liquid fuel in the intake manifold 2 is promoted. When the temperaure of the engine is increased, the valve shaft 13 is rotated in the counter clockwise direction due to the expanding action of the bimetallic element 15 and, as a result, the exhaust gas flow control valve 8 rotates to a position shown by the broken line in FIG. 1. At this time, the exhaust gas flows in the exhaust passage 6 as shown by the arrow B and, therefore, the heating operation of the riser portion 4 is not carried out.

As mentioned above, since clearances of about 0.15 through 0.3 mm are pesent between the bushes 11, 12 and the valve shaft 13, the exhaust gas in the exhaust passage 6 enters into the space formed between the bush 11 and the blind cap 19 via the clearance between the bush 11 and the valve shaft 13. However, since the hole 9 is completely isolated from the atmosphere by means of the blind cap 19, there is no danger that the exhaust gas will leak to the outside of the exhaust manifold 5. On the other hand, the exhaust gas in the exhaust passage 6 enters into the space formed between the bush 12 and the collar 20 via the clearance between the bush 12 and the valve shaft 13. However, since the collar 20 is sealingly fitted onto the valve shaft 13 and, in addition, the collar 20 is urged onto the flat outer face 22 of the housing 7 by the spring force of the compression spring 21, there is no danger that the exhaust gas will leak to the outside of the exhaust manifold 5. Consequently, the leakage of the exhaust gas and the exhaust noise, and the inflow of air into the exhaust gas can be completely prevented. Particularly in the case wherein the bimetallic element 15 is used for rotating the exhaust gas flow control valve 8, as shown in FIGS. 1 and 2, if the exhaust gas leaks into the atmosphere via the clearance the bush 12 and the bimetallic element 13, the exhaust gas thus leaked and having a high temperature comes into direct contact with the bimetallic element 15 and, as a result, there occurs a problem in that thermal deterioration of the bimetallic element 15 is caused. However, in the present invention, there is no danger that such a problem will occur because the leakage of the exhaust gas can be completely prevented.

Figure 3:
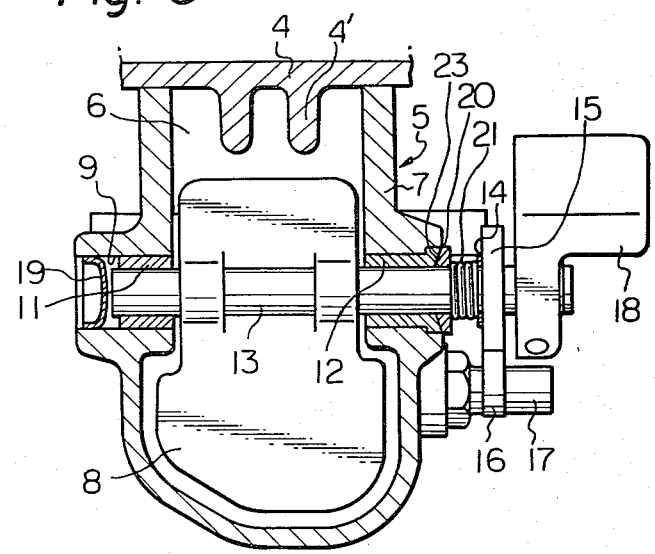
FIG. 3 is a cross-sectional view of another embodiment according to the present invention.

FIG. 3 shows another embodiment according to the present invention. In this embodiment, the outer end face 23 of the bush 12 has a conical shape, and the end face of the collar 20, which abuts against the conical outer end face 23 of the bush 12, has a conical shape which is complementary to the shape of the outer end face 23 of the bush 12. By forming the outer end face 23 and the end face of the collar 20 as mentioned above, a centering operation of the valve shaft 13 is carried out by the collar 20 and, as a result, a smoother rotation of the valve shaft 13 can be obtained.

Figure 4:
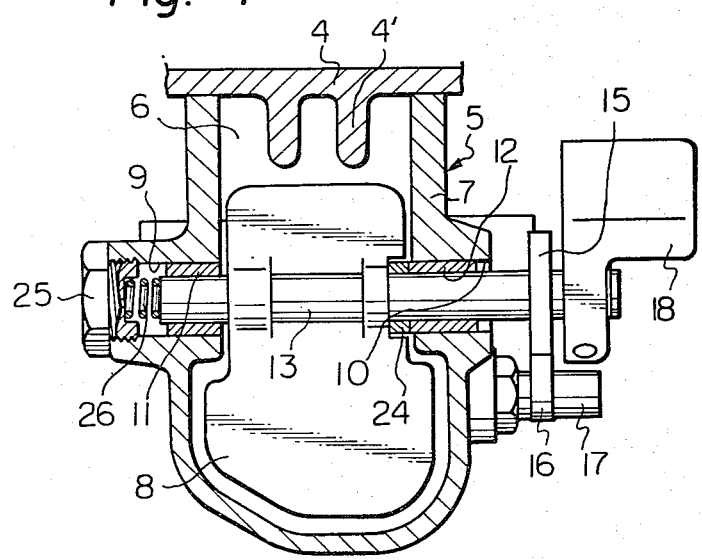
FIG. 4 is a cross-sectional view of a further embodiment according to the present invention.

FIG. 4 shows a further embodiment according to the present invention. In this embodiment, a hollow collar 24 is sealingly fitted onto the valve shaft 13 so as to abut against the inner end face of the bush 12 in exhaust passage 6. On the other hand, a blind screw 25 is screwed into the hole 9, and a compression spring 26 is inserted between the blind screw 25 and the end face of the valve shaft 13. Consequently, in this embodiment, the collar 24 is urged onto the flat end face of the bush 12 by the spring force of the compression spring 26 and, thus, leakage of the exhaust gas is prevented at the contact faces of the collar 24 and the bush 12.

In the embodiment shown in FIG. 1, the exhaust gas flow control valve 8 is used for controlling the heating operation of the intake system. However, the present invention can be applied to an exhaust gas flow control valve apparatus which is used for accomplishing any other object. In addition, the present invention can be applied to an exhaust gas flow control valve apparatus in which a vacuum operated diaphragm device is used for actuating the exhaust gas flow control valve 8 instead of using the bimetallic element 15.

According to the present invention, the leakage of the exhaust gas and the exhaust noise and the occurrence of afterburn can be prevented without a substantial change in the construction of a conventional apparatus.

While the invention has been described by reference to specific embodiments chosen for purposes of illustration, it should be apparent that numerous modifications could be made thereto to by those skilled in the art without departing from the spirit and scope of the invention.

What is claimed is:

1. An exhaust gas flow control valve device in combination with an internal combustion engine having an exhaust housing defining an exhaust passage therein, said device including a rotary shaft extending across the exhaust passage and rotatably inserted into holes formed in opposing walls of the exhaust housing, said rotary shaft having an end portion projecting from one of said opposing walls of the exhaust housing; a valve mounted on said shaft in the exhaust passage for controlling the flow of exhaust gas; and means for rotating said shaft in accordance with change in operating condition of the engine, wherein the improvement comprises:
   sealing means sealingly surrounding sahd shaft at a position near the projecting end portion of said shaft adjacent said one wall of the exhaust housing and
   resilient means for urging said sealing means against the adjacent wall of the exhaust housing for establishing sealing contact between said sealing means and said wall of the housing.

2. An exhaust gas flow control valve device as claimed in claim 1, wherein said sealing means is in contact with an outer surface of said adjacent wall of the exhaust housing.

3. An exhaust gas flow control valve device as claimed in claim 1, wherein said sealing means is arranged in the exhaust passage and is in contact with an inner surface of said adjacent wall of the exhaust housing.

4. An exhaust gas flow control valve device as claimed in claim 1, wherein said sealing means comprises an annular collar which is sealingly fitted onto said valve shaft.

5. An exhaust gas flow control valve device as claimed in claim 4, wherein said hollow collar has a flat end face, and the adjacent wall of the exhaust housing having a flat surface portion which is in contact with the flat end face of said hollow collar.

6. An exhaust gas flow control valve device as claimed in claim 4, wherein said hollow collar has a conical end face, the wall of the exhaust housing having a conical surface portion which is in contact with the conical end face of said hollow collar.

7. An exhaust gas flow control valve device as claimed in claim 6, wherein said hole is formed in a bush fixed into the exhaust housing, said conical surface portion being formed on an end face of said bush.

8. An exhaust gas flow control valve device as claimed in claim 1, wherein said resilient means is in direct contact with said sealing means.

9. An exhaust gas flow control valve device as claimed in claim 8, wherein said sealing means is slidably fitted on the shaft and said resilient means comprises a compression spring interposed between said sealing means and a retainer which is fixed onto the projecting end portion of said shaft.

10. An exhaust gas flow control valve device as claimed in claim 8, wherein a blind cap is inserted into the one of said holes formed in the other wall of the exhaust housing.

11. An exhaust gas flow control valve device as claimed in claim 1, wherein said resilient means is arranged on an end face of said shaft which is located at a position opposite to the projecting end portion of said shaft.

12. An exhaust gas flow control valve device as claimed in claim 11, wherein said resilient means comprises a compression spring interposed between said end face of the shaft and a blind screw which is screwed into said hole.

13. An exhaust gas flow control valve device as claimed in claim 1, wherein said rotating means comprises a bimetallic element.

* * * * *